US012218461B2

(12) United States Patent
DeWitt

(10) Patent No.: US 12,218,461 B2
(45) Date of Patent: Feb. 4, 2025

(54) HIGH POWER ELECTRICAL CONNECTOR

(71) Applicant: Carlisle Interconnect Technologies, Inc., Kent, WA (US)

(72) Inventor: William James DeWitt, Camarillo, CA (US)

(73) Assignee: CARLISLE INTERCONNECT TECHNOLOGIES, INC., Kent, WA (US)

( * ) Notice: Subject to any disclaimer, the term of this patent is extended or adjusted under 35 U.S.C. 154(b) by 279 days.

(21) Appl. No.: 17/818,597

(22) Filed: Aug. 9, 2022

(65) Prior Publication Data

US 2023/0049750 A1 Feb. 16, 2023

Related U.S. Application Data

(60) Provisional application No. 63/231,673, filed on Aug. 10, 2021.

(51) Int. Cl.
*H01R 13/00* (2006.01)
*H01R 13/645* (2006.01)
*H01R 105/00* (2006.01)

(52) U.S. Cl.
CPC ..... *H01R 13/6456* (2013.01); *H01R 2105/00* (2013.01)

(58) Field of Classification Search
CPC ........................ H01R 13/6456; H01R 2105/00
See application file for complete search history.

(56) References Cited

U.S. PATENT DOCUMENTS 1,552,262 A 9/1942 Betz
3,184,706 A 5/1965 Atkins
3,840,839 A 10/1974 Smaczny et al.
4,054,346 A 10/1977 Schultz
4,148,541 A 4/1979 Marks
4,191,443 A 3/1980 Doyle
5,649,837 A * 7/1997 Arnold ............... H01R 13/6315 439/247
7,018,226 B2 * 3/2006 Milner ............... H01R 13/5213 439/321
7,419,398 B2 * 9/2008 Goodman .............. H01R 24/84 439/284
7,458,851 B2 12/2008 Montena
8,764,471 B2 7/2014 Dang
8,979,592 B2 * 3/2015 Dang ................ H01R 13/6271 439/607.41

(Continued)

OTHER PUBLICATIONS

International Searching Authority/ United States, International Search Report and Written Opinion issued for International Application No. PCT/US2022/074722, mailed Nov. 18, 2022, 10 pages.

*Primary Examiner* — Phuong Chi Thi Nguyen
(74) *Attorney, Agent, or Firm* — Stoel Rives LLP

(57) ABSTRACT

An electrical connector including a shell sized to receive and retain an electrically insulating housing insert, where the housing insert includes a cavity for receiving and retaining a wire-terminating electrical contact therein. The shell and housing insert each include a plurality of mating key features designed to provide a plurality of indexing positions for the housing insert, each index position defining an angular orientation of the housing insert relative to the shell to control a direction of the wiring exiting the electrical connector.

20 Claims, 7 Drawing Sheets

(56) References Cited

U.S. PATENT DOCUMENTS

| | | | | |
|---|---|---|---|---|
| 9,306,312 | B2 | 4/2016 | Dang | |
| 9,728,902 | B2 * | 8/2017 | Höher | H01R 13/6592 |
| 11,108,181 | B2 | 8/2021 | Lane | |
| 11,114,796 | B2 | 9/2021 | Dewitt | |
| 2007/0281552 | A1 | 12/2007 | Gleissner et al. | |
| 2018/0040833 | A1 * | 2/2018 | Ahn | C07D 401/12 |
| 2018/0138633 | A1 * | 5/2018 | DeWitt | H01R 13/5219 |
| 2020/0036126 | A1 | 1/2020 | Kobayashi et al. | |
| 2020/0176919 | A1 | 6/2020 | Dewitt | |

* cited by examiner

HIGH POWER ELECTRICAL CONNECTOR

RELATED APPLICATION DATA

This application is a nonprovisional of and claims the benefit under 35 U.S.C. § 119(e) of U.S. Provisional Patent Application No. 63/231,673, filed Aug. 10, 2021 and entitled "HIGH POWER ELECTRICAL CONNECTOR," the disclosure of which is incorporated by reference herein in its entirety.

BACKGROUND

The field of this disclosure relates generally to electrical connectors and, in particular, to electrical connectors designed for accommodating large electrical contacts suitable for high-power applications.

Electrical connectors are commonly used to connect electronic devices for facilitating communication and information transfer. Electrical connectors may be used in a variety of applications, such as for high-speed data transmission, for handling large electrical loads in high-power applications, or in other suitable settings. That said, electrical connectors commonly used for terrestrial applications are typically not suitable for aerospace and other applications. In aerospace and other applications, electrical connectors are subjected to a variety of harsh environmental conditions, such as the presence of moisture, vibrations and mechanical shock, high external electrical and magnetic interference, and temperature and pressure changes, all of which can detrimentally affect an electrical connector's performance. Accordingly, suitable electrical connector designs must be capable of maintaining optimum performance in these environmental conditions.

Moreover, the aircraft industry is moving toward electrification of aircraft to provide efficient, quiet, and sustainable flights. One challenge impacting this transition is the need for electrical systems capable of supplying and channeling the immense power that is required to properly support an all-electric or hybrid aircraft design. For example, in some designs, voltage requirements range from 270 DC to 4200 A/C and DC. Currently, electrical connector designs are not capable of this power input while also meeting requirements for use in aerospace applications. The largest, standard 38999 electrical connector is manufactured at shell size 25 and is capable of housing a single 1/0 contact, which simply does not provide sufficient power to meet the needs of the aircraft industry.

Accordingly, the present inventor has recognized a need for a robust electrical connector capable of maintaining peak performance in demanding industries, such as aerospace systems, aircraft electronic systems, and other similar high-power applications while also satisfying all the requirements for operating under in-flight conditions. Additional aspects and advantages will be apparent from the following detailed description of example embodiments, which proceeds with reference to the accompanying drawings.

DETAILED DESCRIPTION OF EXAMPLE EMBODIMENTS

Figure 1:
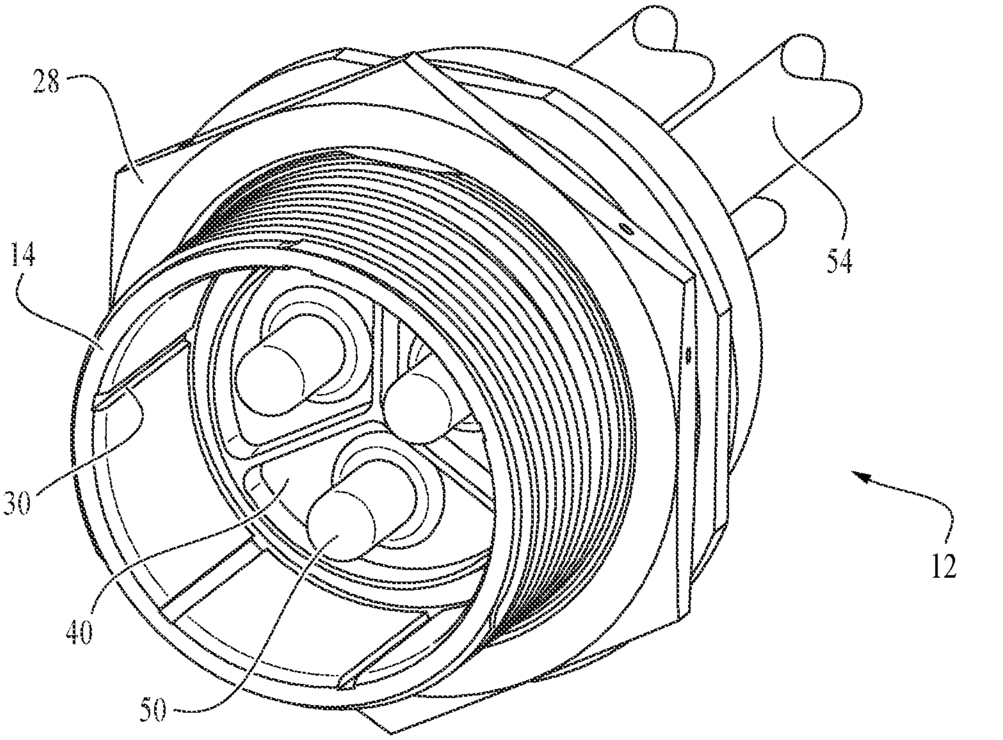
FIG. 1 is a perspective view of a pin connector with a hybrid 38999 shell size 35 jam nut in accordance with one embodiment.
Figure 2:
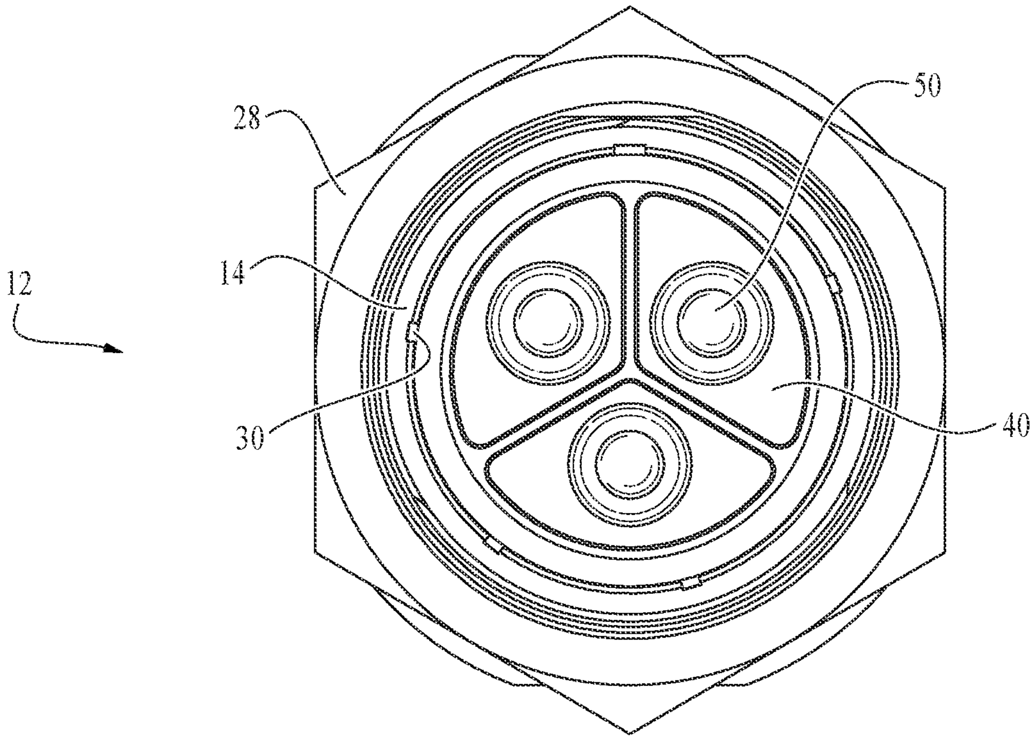
FIG. 2 is a front view of the pin connector of FIG. 1.

With reference to the drawings, this section describes various embodiments of an improved electrical connector and its construction and operation. Throughout the specification, reference to "one embodiment," "an embodiment," or "some embodiments" means that a particular described feature, structure, or characteristic may be included in at least one embodiment of an electrical connector. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

For reference, the following disclosure describes example embodiments of an electrical connector system designed for use in high-power applications, where the electrical connector system is capable of providing continuous current at 500 amps or more. This high-power connector design may be useful in the aerospace industry and other related applications, such as aircraft electronic systems. With general reference to the figures, the following description relates to an electrical connector system suitable for high-power applications, where the overall components of the electrical connector system are designed to maintain optimal performance under harsh environmental conditions.

In the following description, certain components of the electrical connector system are described in detail, while in some instances, well-known structures, materials, or operations are not shown or not described in detail to avoid obscuring more pertinent aspects of the embodiments. It should be understood that one having ordinary skill in the art understands how to incorporate the features of the electrical connector design described below into a functional electrical connector, even though certain aspects of the electrical connectors are not further described herein.

In some embodiments, the electrical connector system described herein is designed to operate under some or all of the following conditions: (1) maximum operating voltage of 1200 VDC; (2) a minimum continuous current of 500 A; (3) an operating temperature range of −65° C. to 260° C.; and (4) an operational altitude range of −2000 ft to 50000 ft. In addition, the electrical connector system is further designed to satisfy all MIL-DTL-38999 Series III specifications and EIA-364 test procedure 10 for fluid immersion. The electrical connector system further has the following features: (1) Comparative Tracking Index (CTI): >600V per ASTM D3638; (2) Dielectric Withstand Voltage (DWV): 2500 Volts; (3) creepage and clearance distances: 1200 VDC at altitude; (4) wet arc resistance: 1200 VDC; and (5) dry arc resistance: 1200 VDC. Additional details, advantages, and features of the electrical connector design are provided below with particular reference to the figures.

FIGS. 1-9 collectively illustrate details of an electrical connector system 10 including a pair of mated electrical connectors 12, 76 in accordance with one embodiment. With general reference to FIG. 9, the electrical connector system 10 includes a pin connector 12 that interfaces and mates with a socket connector 76 to create an electrical connection between the wires 54, 140 of the respective connectors 12, 76. As described in further detail below, each connector 12, 76 includes wires covered with appropriate insulating material and terminated at one end by an electrical contact (e.g., a pin contact 50 or a socket contact 132). Each connector 12, 76 may be designed and arranged to accommodate three size 1/0 electrical contacts 50, 132. While the example embodiments described herein are described with reference to size 1/0 contacts, it should be understood that this particular size and configuration for the electrical connector system 10 is for illustration purposes. In other embodiments, the connector design and contact size may be adjusted to accommodate additional contacts without departing from the principles of the claimed subject matter as further described below. With general reference to FIGS. 4 and 8, each of the pin connector 12 and socket connector 76 may include an alphanumeric scale 74, 158 visible along the rear portion of the respective connectors 12, 76 to facilitate insertion of the housing inserts 40, 122 for the electrical contacts 50, 132 in a desired rotational position to provide better control for an exit direction of the wires 54, 140 exiting the connectors 12, 76. Additional details of these and other embodiments are provided below with reference to the figures.

With general reference to FIGS. 1-9, the following description focuses on the design and arrangement of the pin connector 12 and the socket connector 76 of the electrical connector system 10 to achieve a connector design capable of providing continuous current at 500 amps or more, while maintaining appropriate shielding, mechanical shock and vibration resistance, and performance in extreme temperature and pressure changes. The discussion begins with details relating first to the pin connector 12 with reference to FIGS. 1-4, followed by a description of the socket connector 76 with reference to FIG. 5-8, and concludes with a discussion focusing on how the respective components interact with one another when the connectors 12, 76 are mated with reference to FIG. 9.

FIGS. 1-4 collectively illustrate a hybrid 38999 size 35 pin connector 12 of the electrical connector system 10. With general reference to FIG. 3, the pin connector 12 includes a jam nut shell 14 having a generally tubular body 16, the body 16 including a front end 18, a rear end 20, and a cavity 22 extending along an axial direction through the body 16 from the front end 18 to the rear end 20. The body 16 is described herein as being generally tubular, but it should be understood that the body 16 may have other shapes and configurations in other embodiments. The shell 14 may be formed as a unitary structural member and is preferably made of titanium due to its expansion characteristics and lighter weight as compared to stainless steel or other materials. As noted previously, the electrical connector system 10 is designed for providing continuous current at 500 amps or more, so the use of titanium allows for minimal expansion of the shell 14 and reduces overall weight of the large electrical connector system 10. The shell 14 may be approximately 2.75 to 3.00 inches in diameter, so maintaining a lower weight for the shell 14 is important given the overall size of the pin connector 12. In other embodiments, other materials may be used as desired.

Figure 3:
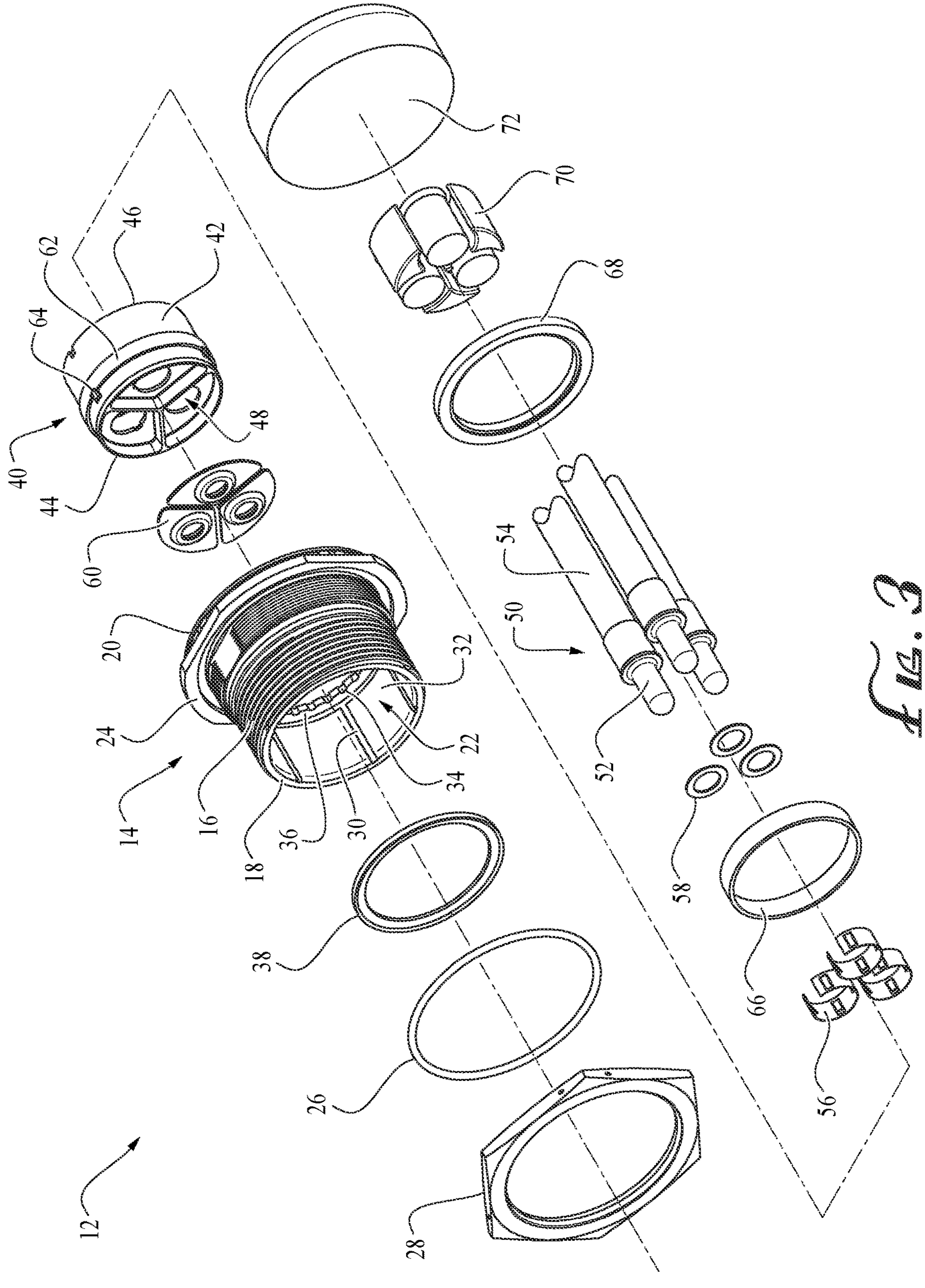
FIG. 3 is an exploded view of the pin connector of FIG. 1.

As illustrated in FIG. 3, the body 16 further includes a shoulder 24 formed adjacent the rear end 20 against which is seated a sealing member 26 (illustrated as an O-ring in FIG. 3) when the pin connector 12 is assembled. The exterior surface of the body 16 is threaded and dimensioned to receive a jam nut 28 that encircles a portion of the exterior surface of the body 16. The shell 14 further includes a plurality of locking channels 30 formed along an interior surface 32 of the shell 14. As further described in detail below with reference to FIG. 9, the locking channels 30 engage corresponding locking keys 94 formed on the shell 78 of the socket connector 76 when the connectors 12, 76 are mated. Returning to FIG. 3, the shell 14 further includes a plurality of key features 34 illustrated as slots or cutaway regions formed along the interior surface 32, the key features 34 extending along the entire circumference of the interior surface 32 of the body 16. In some embodiments, the key features 34 may be formed on an interior lip 36 raised from the interior surface 32. To establish a frame of reference, the interior lip 36 and key features 34 are formed adjacent the rear end 20 of the body 16 and behind a position of the channels 30 relative to the front end 18, where the key features 34 face inwardly toward the cavity 22. As is further described in detail below with particular reference to FIG. 4, the key features 34 are arranged along the interior surface 32 (or on an interior lip 36 formed within the interior surface 32) of the shell 14 and correspond with a number of indexing positions for receiving and orienting the housing insert 40 containing the pin contacts 50 in a desired position. Returning to FIG. 3, the shell 14 further includes a mating seal 38 seated within the cavity 22 against the lip 36, the mating seal 38 facing toward the front end 18 of the shell 14.

With reference to FIG. 3, the pin connector 12 further includes a housing insert 40 having a generally tubular body 42, the body 42 including a front end 44, a rear end 46, and a plurality of contact-receiving cavities 48, each contact-receiving cavity 48 extending along an axial direction through the body 42 from the front end 44 to the rear end 46. While the body 42 is described herein as being generally tubular, it should be understood that the body 42 may have other shapes and configurations in other embodiments, where the shape of the body 42 of the housing insert 40 corresponds to the shape of the body 16 of the shell 14. The housing insert 40 may be formed from any suitable material with desirable electrical insulation and heat resistant properties for improved performance of the electrical connector system 10. For example, in some embodiments, the housing insert 40 may be formed of a ceramic material. In these embodiments, using a ceramic material for the housing insert 40 is advantageous for its dielectric and arc tracking capabilities and its thermal expansion compatibility with the titanium material used for the shell 14. The ceramic material also allows the electrical connector system 10 to operate at the range of desired temperature from −65° C. to 260° C. In other embodiments, the housing insert 40 may be made from a thermoset plastic material (such as diallyl phthalate), or a thermoplastic material (such as polyether ether ketone, polyetherimide, or polybutylene terephthalate), or other suitable insulator material.

Each contact-receiving cavity 48 of the housing insert 40 receives a corresponding size 1/0 pin contact 50 within a seat (see FIG. 9) formed within the housing insert 40. When the pin contact 50 is seated within the corresponding contact-receiving cavity 48, a head 52 of the pin contact 50 extends outwardly through the front end 44 of the housing insert 40 and the insulated wire 54 terminated by the pin contact 50 extends outwardly along the rear end 46 of the housing insert 40. The pin contact 50 made of any suitable conductive metal or metal alloy such as copper, aluminum, or nickel (or nickel-plated material) designed to carry high current. In the illustrated configuration, each of the 1/0 pin contacts 50 is rated to 150 A (for a total rating of 450 A when the pin connector 12 uses three contacts). It should be understood, however, that the size of the pin connector 12 is scalable to any size needed to achieve the 500 A target (or more). A contact-retaining clip 54 and potting seal 56 disposed within the contact-receiving cavity 48 of the housing insert 40, and a face seal 58 seated along the front end 44 of the housing insert 40 collectively retain the pin contact 50 in proper position and orientation within the housing insert 40.

With reference to FIG. 3, the housing insert 40 further includes a shoulder 62 extending along the circumference of the exterior surface of the body 42. Adjacent the shoulder 62, the housing insert 40 includes a plurality of key features 64 (illustrated as locking ribs) formed thereon and spaced apart from one another. With reference to the embodiment illustrated in FIG. 3, the housing insert 40 may include three spaced key features 64 set apart at approximately 120 degree intervals, but other embodiments may include any number of key features 64 as desired. As noted previously, the shell 14 includes a plurality of key features 34 formed along the interior surface 32 thereof. The key features 34 of the shell 14 are designed to receive and mate with the key features (e.g., locking ribs) 64 of the housing insert 40 when the pin connector 12 is assembled. The key features 34 may be arranged at any suitable interval depending on the number of indexing positions that are desired. For example, in the illustrated embodiment, each key feature 34 is set apart at 15 degree intervals from an adjacent key feature 34 along the interior surface 30 of the shell 14. This configuration allows the housing insert 40 with three key features 64 to be indexed to the shell 14 in any one of 24 unique positions, based on the key features 64 of the housing insert 40 engaging a particular subset of key features 34 of the shell 14. In other embodiments, the corresponding number of key features 34, 64 may be altered as desired to increase or decrease the number of indexing positions for the housing insert 40.

In an assembled configuration, the key features 34, 64 cooperate to retain the housing insert 40 in a desired angular alignment and resist independent rotation of the housing insert 40 to keep it from freely rotating within the shell 14. This configuration allows for the housing insert 40 to be rotated and inserted into the shell 14 as needed to optimize the angular positioning of the wires 54 exiting from the rear end 46 of the housing insert 40 and from the pin connector 40. This flexibility may be helpful when configuring the electrical connector system 10 for use in the field since there may not be advanced knowledge of how the wires 54 will be routed through the electrical connector system 10 until deployment. For example, if the wires 54 need to exit the pin connector 12 at a 90-degree turn, then the appropriate indexing position for the housing insert 40 may be used to provide a suitable arrangement that allows the wires 54 to satisfy this requirement. If, on the other hand, the wires 54 need to exit the pin connector 12 at a 45-degree turn, then a different indexing position may be used, and so on. It should be understood that while the figures illustrate the key features 64 as raised ribs on the housing insert 40 and the corresponding key features 34 as slots on the shell 14, the arrangement of these features could be swapped in other embodiments. For example, the ribs could instead be formed on the shell 14 and the corresponding slots could be formed on the housing insert 40.

When the housing insert 40 is inserted into the shell 14 and mated with the key features 34, a retaining ring 66 seated against the shoulder 62 and encircling an exterior surface of the housing insert 40 may help further secure the housing insert 40 in position within the shell 14. In some embodiments, the pin connector 12 may further include potting material 68, 70 deployed within the shell 14 for improved resistance to shock and vibration, and to seal against water, moisture, or corrosive agents. In some embodiments, the pin connector 12 may include over-molding material 72 to seal the rear end 20 of the shell 14 and further protect against the intrusion of dust, debris, and moisture. When using titanium for the shells 14 and ceramic for the housing inserts 40, the lack of thermal expansion differences between these materials allows for the pin connector 12 to be hermetically sealed.

Figure 4:
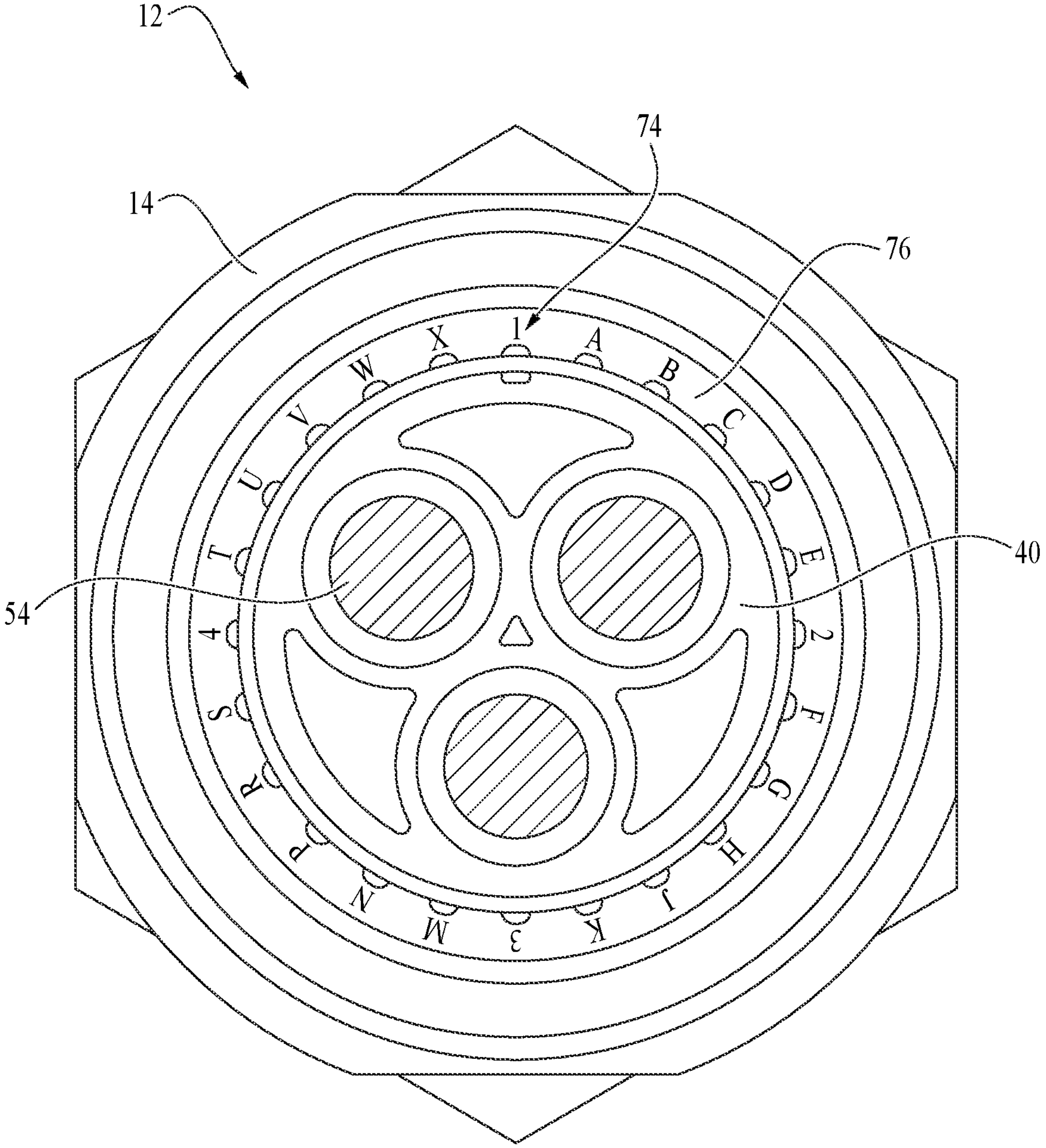
FIG. 4 is a rear view of the pin connector of FIG. 1 with potting material removed to illustrate an alphanumeric scale for facilitating control of the wire exit position.
Figure 5:
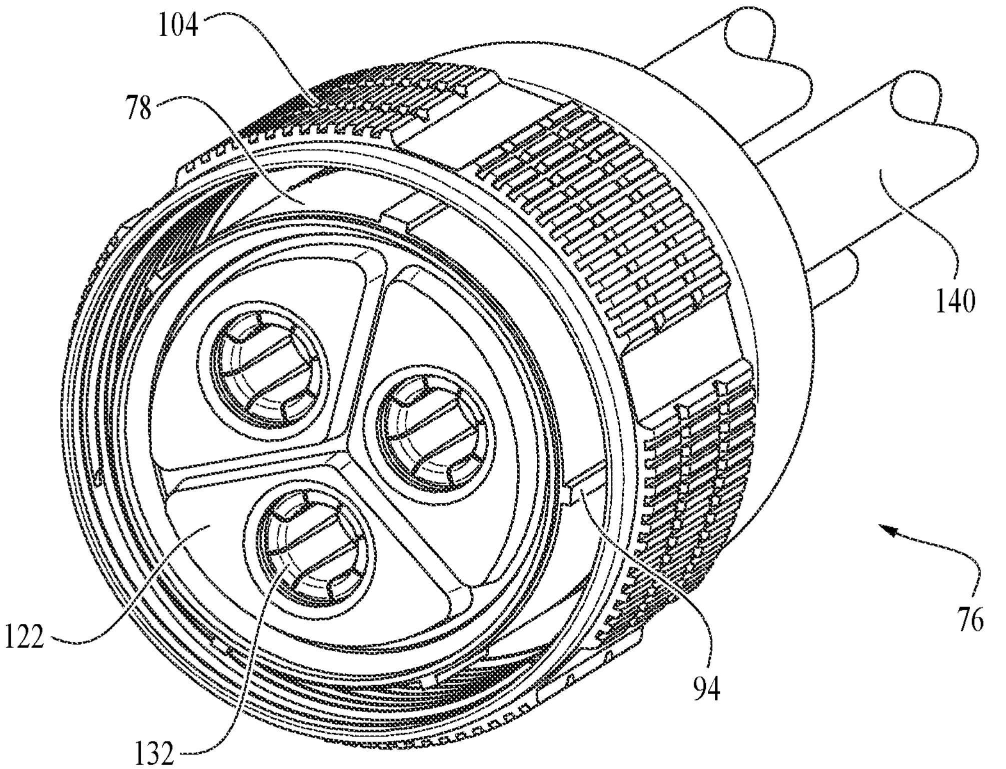
FIG. 5 is a perspective view of a socket connector with a hybrid 38999 shell size 35 socket connector in accordance with one embodiment.
Figure 6:
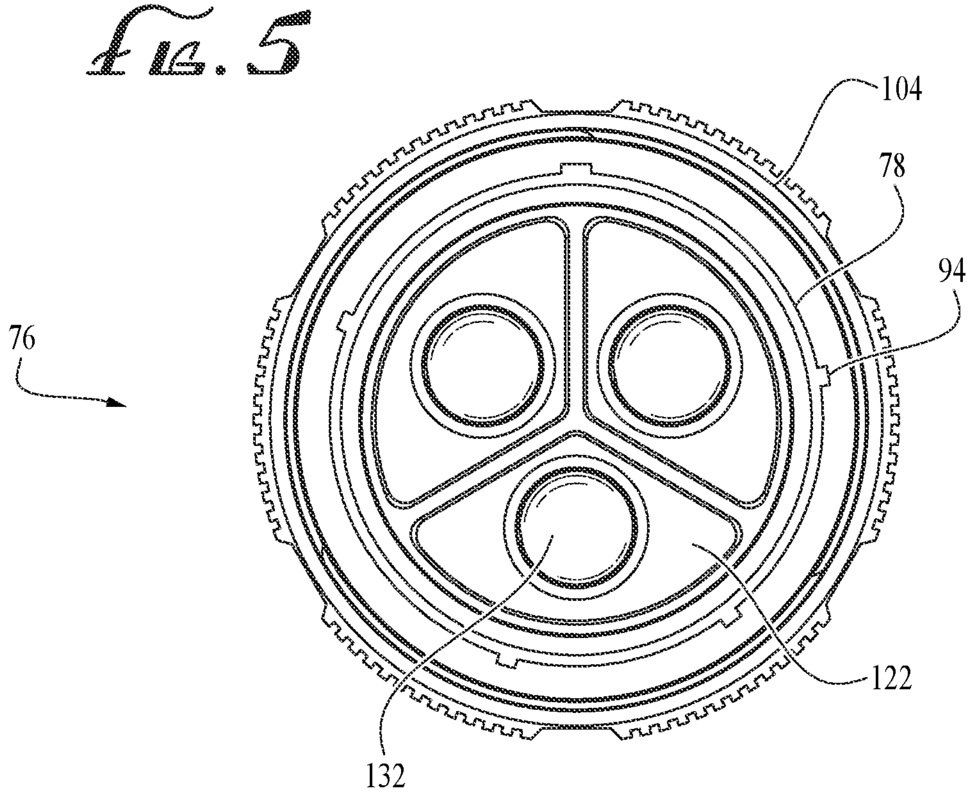
FIG. 6 is a front view of the socket connector of FIG. 5.

FIG. 4 is a rear view of the pin connector 12 with potting and over-molding material removed to illustrate additional features of the pin connector 12. With reference to FIG. 4, the pin connector 12 further include a scale 74 on an interior surface 76 of the shell 14, where the scale 74 may be used to easily identify with unique notations the various indexing positions available for the housing insert 40 to facilitate the connector mating process. Each notation on the scale 74 is arranged to correspond with a position of a key feature 34 on the shell 14. For example, in the illustrated configuration, each notation on the scale 74 is set apart at 15 degree intervals to match the angular position of the key features 34. In this fashion, the scale 74 may be a useful resource to facilitate the quick arrangement of the housing insert 40 at a desired rotational position to ensure that the wires 54 are exiting the pin connector 12 as desired. In some embodiments, the scale 74 uses an alphanumeric notation, where numbers are used to identify four quadrants and letters are used to identify specific positions within each quadrant. In other embodiments, other suitable notations may be used.

FIGS. 5-8 collectively illustrate a hybrid 38999 size 35 socket connector 76 of the electrical connector system 10. With general reference to FIG. 7, the pin connector 76 includes a shell 78 having a generally tubular body 80, the body 80 including a front end 82, a rear end 84, and a cavity 86 extending along an axial direction through the body 80 from the front end 82 to the rear end 84. The body 80 is described herein as being generally tubular, but it should be understood that the body 80 may have other shapes and configurations in other embodiments. The shell 78 may be formed as a unitary structural member and is preferably made of titanium due to its expansion characteristics and lighter weight as compared to stainless steel or other materials. As noted previously, the electrical connector system 10 is designed for providing continuous current at 500 amps or more, so the use of titanium allows for minimal expansion of the shell 78 and reduces overall weight of the large electrical connector system 10. The shell 78 may be approximately 2.50 to 2.75 inches in diameter, so maintaining a lower weight for the shell 78 is important given the overall size of the socket connector 76. In other embodiments, other materials may be used as desired.

Figure 7:
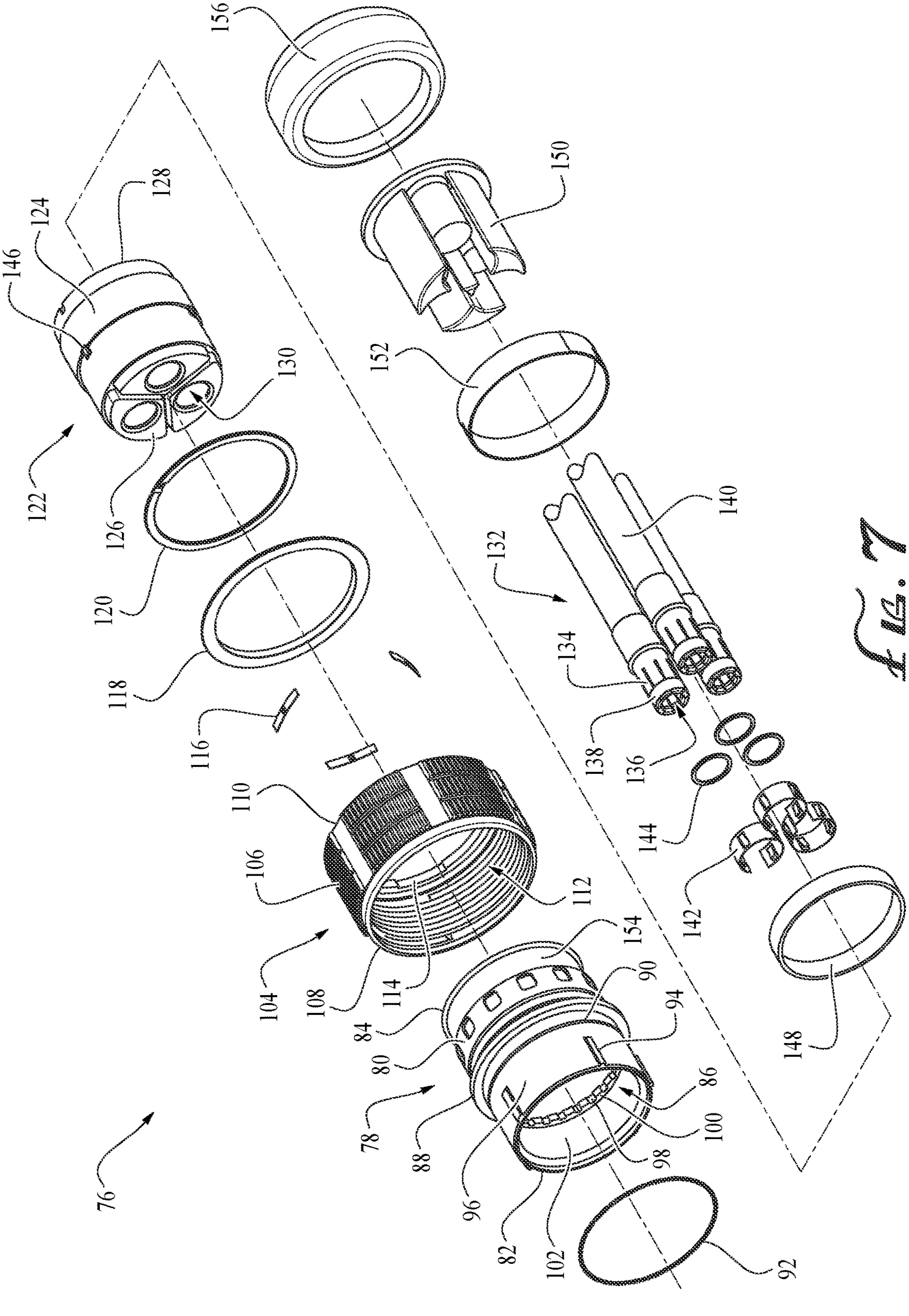
FIG. 7 is an exploded view of the socket connector of FIG. 5.

As illustrated in FIG. 7, the body 80 further includes a shoulder 88 formed adjacent a middle of the body 80 and a channel 90 encircling the body within which is seated a bal-seal spring 92 to help retain the shell 78 and a coupling nut 104 in a mated configuration when the socket connector 76 is assembled. The shell 78 further includes a plurality of locking keys 94 formed along an exterior surface 96 of the shell 78. As further described in detail below with reference to FIG. 9, the locking keys 94 engage corresponding locking channels 30 formed on the shell 14 of the pin connector 12 when the connectors 12, 76 are mated. Returning to FIG. 7, the shell 78 further includes a plurality of key features 98 illustrated as slots or cutaway regions formed along the interior surface 102, the key features 98 extending along the entire circumference of the interior surface 102 of the body 80. In some embodiments, the key features 98 may be formed on an interior lip 100 raised from the interior surface 102. In either arrangement, the key features 98 face inwardly toward the cavity 86 within the shell 78. As is further described in detail below with particular reference to FIG. 8, the key features 98 are arranged along the interior surface 102 of the shell 78 (or on the interior lip 100 formed within the interior surface 102) and correspond with a number of indexing positions for receiving and orienting the housing insert 122 containing the socket contacts 132 in a desired position.

The socket connector 76 further includes a coupling nut 104 having a having a generally tubular body 106, the body 106 including a front end 108, a rear end 110, and a cavity 112 extending along an axial direction through the body 106 from the front end 108 to the rear end 110. Adjacent the rear end 110 of the body 106, the coupling nut 104 includes a plurality of slots 114 sized and dimensioned to each receive a rachet spring 116. When the coupling nut 104 and shell 78 are mated, the ratchet springs 116 are seated behind the shoulder 88 and against the body 80 of the shell 78, and along with a retaining washer 118 and a retain ring 120, cooperate to secure the components together.

With reference to FIG. 7, the socket connector 76 further includes a housing insert 122 having a generally tubular body 124, the body 122 including a front end 126, a rear end 128, and a plurality of contact-receiving cavities 130, each contact-receiving cavity 130 extending along an axial direction through the body 122 from the front end 126 to the rear end 128. While the body 124 is described herein as being generally tubular, it should be understood that the body 124 may have other shapes and configurations in other embodiments, where the shape of the body 124 of the housing insert 122 corresponds to the shape of the body 80 of the shell 78. The housing insert 122 may be formed from any suitable material with desirable electrical insulation and heat resistant properties for improved performance of the electrical connector system 10. For example, in some embodiments, the housing insert 122 may be formed of a ceramic material. In these embodiments, using a ceramic material for the housing insert 122 is advantageous for its dielectric and arc tracking capabilities and its thermal expansion compatibility with the titanium material used for the shell 78. The ceramic material also allows the electrical connector system 10 to operate at the range of desired temperature from −65° C. to 260° C. In other embodiments, the housing insert 122 may be made from a thermoset plastic material (such as diallyl phthalate), or a thermoplastic material (such as polyether ether ketone, polyetherimide, or polybutylene terephthalate), or other suitable insulator material.

Each contact-receiving cavity 130 of the housing insert 122 receives a corresponding size 1/0 socket contact 132 within a seat (see FIG. 9) formed within the housing insert 122. The socket contact 132 includes a plurality of cantilevered fingers 134 along a front end thereof, the fingers 134 being arranged generally parallel relative to a central opening 136 extending through a portion of the socket contact 132. In some embodiments, the socket contacts 132 may include a napkin ring 138 designed to impart suitable elastic properties to allow the cantilevered fingers 134 to have desired spring force properties when mating with the pin contact 50 as further described below with reference to FIG. 9. When the socket contact 132 is seated within the corresponding contact-receiving cavity 130, the fingers 134 of the socket contact 132 extend outwardly through the front end 126 of the housing insert 122 and an insulated wire 140 terminated by the socket contact 132 extends outwardly along the rear end 128 of the housing insert 122. The socket contact 132 is made of any suitable conductive metal or metal alloy such as copper, aluminum, or nickel (or nickel-plated material) designed to carry high current. In the illustrated configuration, each of the 1/0 socket contacts 132 is rated to 150 A (for a total rating of 450 A when the socket connector 76 uses three contacts). It should be understood, however, that the size of the socket connector 76 is scalable to any size needed to achieve the 500 A target (or more). A contact-retaining clip 142 and a potting seal 144 is disposed within the contact-receiving cavity 130 of the housing insert 122 to retain the socket contact 132 in proper position and orientation within the housing insert 122.

With reference to FIG. 3, the housing insert 122 further includes a plurality of key features 146 (illustrated as locking ribs) formed thereon and spaced apart from one another. With reference to the embodiment illustrated in FIG. 7, the housing insert 122 may include three spaced key features 146 set apart at approximately 120 degree intervals, but other embodiments may include any number of key features 146 as desired. As noted previously, the shell 78 includes a plurality of key features 98 formed along the interior surface 102 thereof. The key features 98 of the shell 78 are designed to receive and mate with the key features 146 (e.g., locking ribs) of the housing insert 122 when the socket connector 76 is assembled. The key features 98 may be arranged at any suitable interval depending on the number of indexing positions that are desired. For example, in the illustrated embodiment, each key feature 98 is set apart at 15 degree intervals from an adjacent key feature 98 along the interior surface 102 of the shell 78. This configuration allows the housing insert 122 with three key features 146 to be indexed to the shell 78 in any one of 24 unique positions, based on the key features 146 of the housing insert 122 engaging a particular subset of key features 98 on the shell 78. In other embodiments, the corresponding number of key features 98, 146 may be altered as desired to increase or decrease the number of indexing positions for the housing insert 122.

In an assembled configuration, the key features 98, 146 cooperate to retain the housing insert 122 in a desired angular alignment and resist independent rotation of the housing insert 122 to keep it from freely rotating within the shell 78. This configuration allows for the housing insert 122 to be rotated and inserted into the shell 78 as needed to optimize the angular positioning of the wires 140 exiting from the rear end 128 of the housing insert 122 and from the socket connector 76. This flexibility may be helpful when configuring the electrical connector system 10 for use in the field since there may not be advanced knowledge of how the wires 140 will be routed through the electrical connector system 10 until deployment. For example, if the wires 140 need to exit the socket connector 76 at a 90-degree turn, then the appropriate indexing position for the housing insert 122 may be used to provide a suitable arrangement that allows the wires 140 to satisfy this requirement. If, on the other hand, the wires 140 need to exit the socket connector 76 at a 45-degree turn, then a different indexing position may be used, and so on. It should be understood that while the figures illustrate the key features 146 as raised ribs on the housing insert 122 and the corresponding key features 98 as slots on the shell 78, the arrangement of these features could be swapped in other embodiments. For example, the ribs could instead be formed on the shell 78 and the corresponding slots could be formed on the housing insert 122.

When the housing insert 122 is inserted into the shell 78 and mated with the key features 98, a retaining ring 148 encircles an exterior surface of the housing insert 122 to help further secure the housing insert 122 in position within the shell 78. In some embodiments, the socket connector 76 may further include potting material 150 deployed within the shell 78 for improved resistance to shock and vibration, and to seal against water, moisture, or corrosive agents. The socket connector 76 further includes a shielding band 152 positioned against a seat 154 formed adjacent a rear end 84 of the shell 78, and over-molding material 156 covering the shielding band 152 and sealing the rear end 84 of the shell 78 to further protect against the intrusion of dust, debris, and moisture. When using titanium for the shells 78 and ceramic for the housing inserts 122, the lack of thermal expansion differences between these materials allows for the socket connector 76 to be hermetically sealed.

Figure 8:
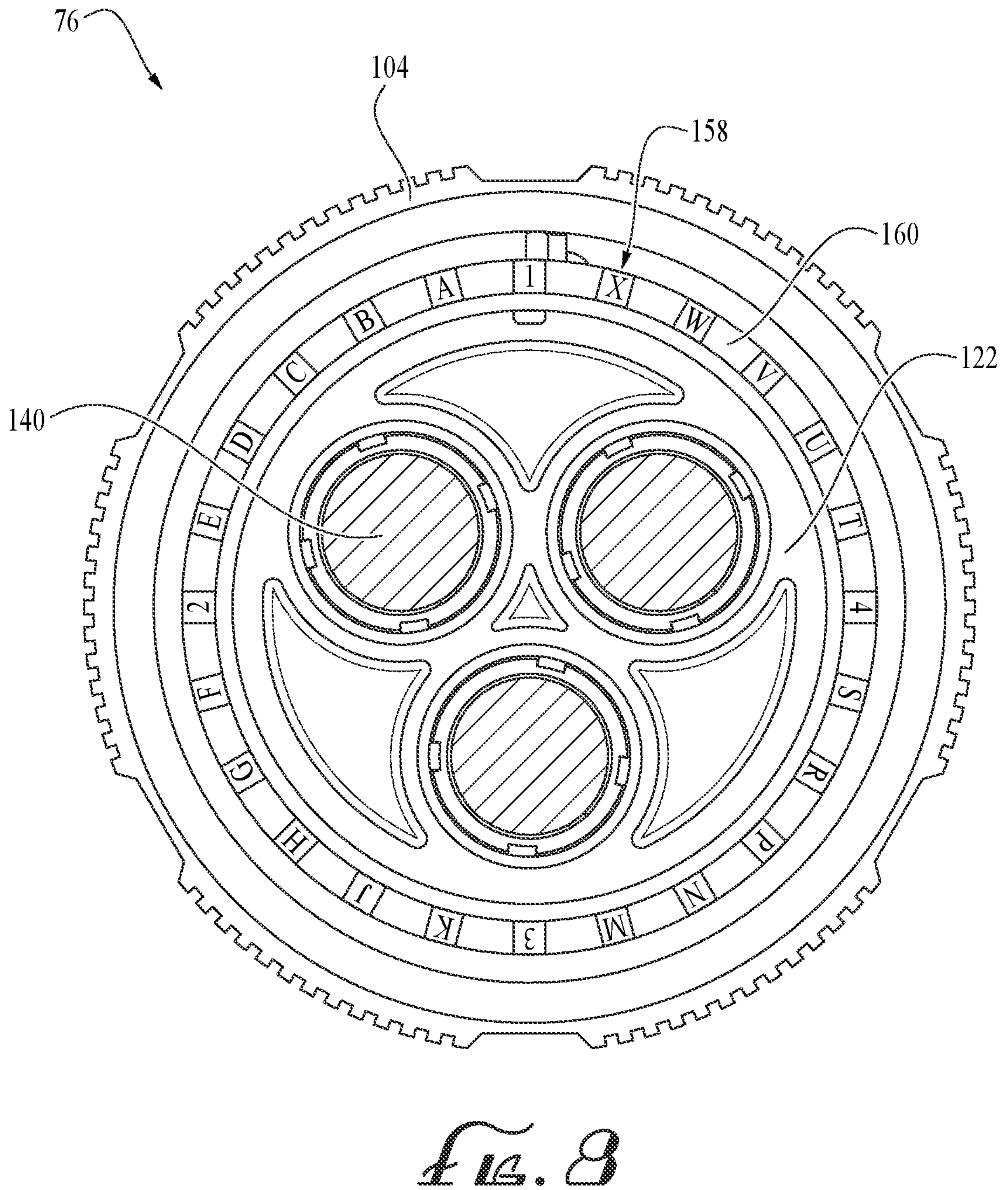
FIG. 8 is a rear view of the socket connector of FIG. 5 with potting material removed to illustrate an alphanumeric scale for facilitating control of the wire exit position.

FIG. 8 is a rear view of the socket connector 76 with potting and over-molding material removed to illustrate additional features of the socket connector 76. With reference to FIG. 8, the socket connector 76 further include a scale 158 on an interior surface 160 of the shell 78, where the scale 158 may be used to easily identify with unique notations the various indexing positions available for the housing insert 122 to facilitate the connector mating process. Each notation on the scale 158 is arranged to correspond with a position of a key feature 98 on the shell 78. For example, in the illustrated configuration, each notation on the scale 158 is set apart at 15 degree intervals to match the angular position of the key features 98. In this fashion, the scale 158 may be a useful resource to facilitate the quick arrangement of the housing insert 122 at a desired rotational position to ensure that the wires 140 are exiting the socket connector 76 as desired. In some embodiments, the scale 158 uses an alphanumeric notation, where numbers are used to identify four quadrants and letters are used to identify specific positions within each quadrant. In other embodiments, other suitable notations may be used.

Figure 9:
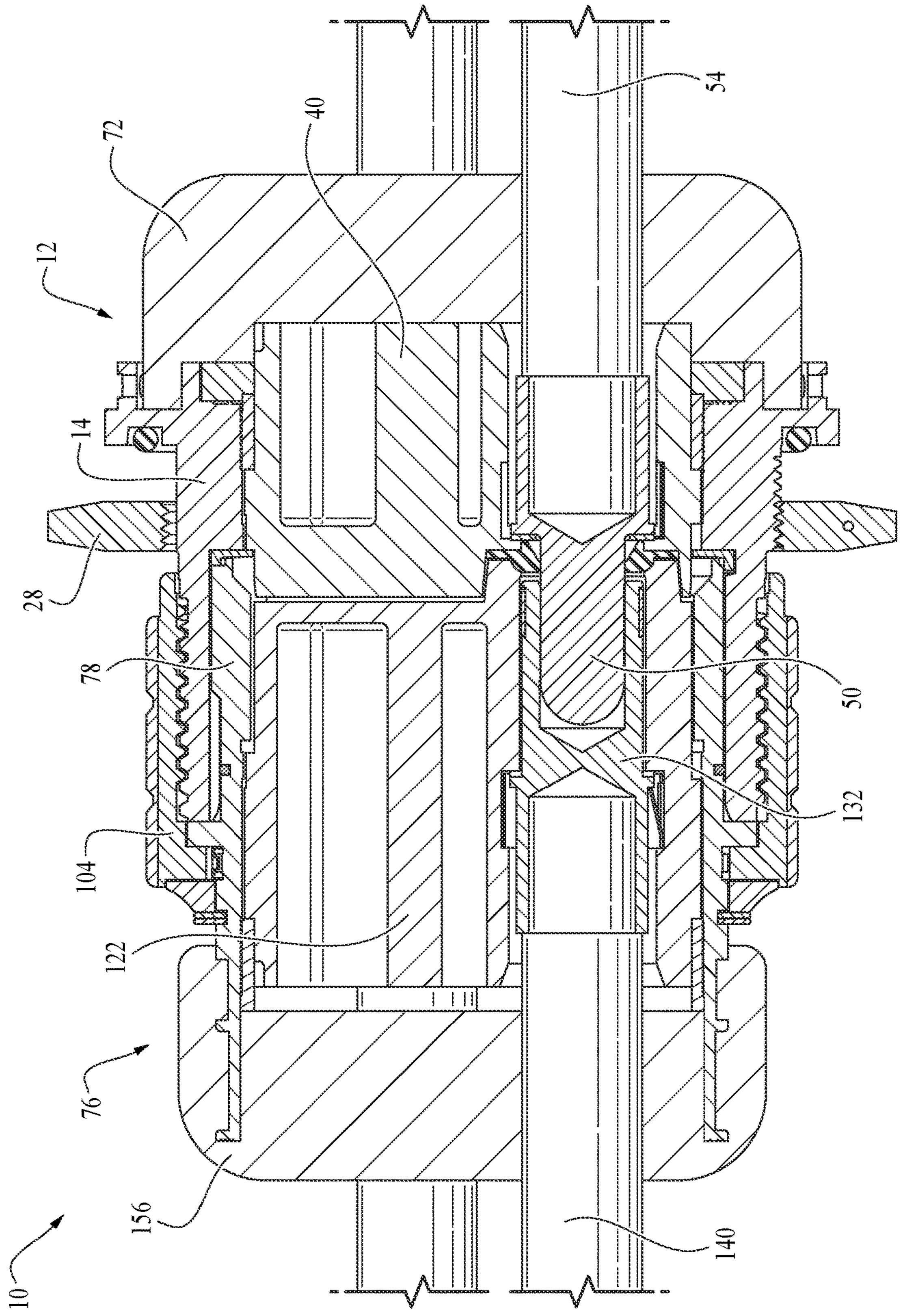
FIG. 9 illustrates a cross-section view of the pin and socket connectors in a mated configuration in accordance with one embodiment.

FIG. 9 illustrates a cross-section view of the pin and socket connectors 12, 76 in a mated configuration in accordance with one embodiment. With reference to FIG. 9, to mate the pin and socket connectors 12, 76, the connectors are aligned such that the pin contacts 50 of the pin connector 12 face the socket contacts 132 of the socket connector 76. In this configuration, the connectors 12, 76 are oriented to ensure that the locking keys 94 of the socket connector 76 (see FIG. 7) are aligned with the locking channels 30 of the pin connector 12 (see FIG. 3). Once these components are in proper alignment, the connectors 12, 76 are brought together until the openings 136 of the socket contacts 132 receive the corresponding pin contacts 50 and the locking channels 30 receive the locking keys 94. As illustrated in FIG. 9, in a fully assembled configuration, the shell 14 of the pin connector 12 is positioned between the shell 78 and the coupling nut 104 of the socket connector 76 to create an electrical connection between the wires 54, 140 of the respective connectors 12, 76.

As illustrated in FIGS. 1-9 and described above, the high-power electrical connector system 10 has a pin and socket connector 12, 76 design for improved vibration resistance. As illustrated, the socket contacts 132 are designed with fingers or flanges to create multiple contact surfaces between the pin and socket contacts 50, 132 for aiding in aligning the contacts during the mating process, and for minimizing lateral and rotational movement of the contacts after assembly. The reduction in movement helps prevent unwanted electrical bounce preventing arcing between the respective contacts, resulting in improved overall performance for the electrical connector. In addition, this configuration creates an increased contact surface area, as compared to conventional designs, which helps prevent heat concentration between the contacts at the contact interface. In some embodiments, a napkin ring 138 may be used to increase the force and maintain better engagement between the pin and socket contacts 50, 132 to provide better performance in high vibration environments. Also as discussed above, each of the connectors 12, 76 includes a visible alphanumeric scale 74, 158 formed on their respective shells 14, 78 to facilitate the connector assembly process and provide a reference for orienting the housing inserts 40, 122 as desired to control an exit direction of the wires 54, 140 as needed when deploying the connector system 10 in the field.

Although the description above contains certain details, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable. The terms and descriptions used above are set forth by way of illustration only and are not meant as limitations. It will be obvious to those having skill in the art that many changes may be made to the details of the above-described embodiments without departing from the underlying principles of the invention. Those having skill in the art should understand that other embodiments than those described herein are possible.

The invention claimed is:

1. An electrical connector comprising:

a shell including a body, the body having a front end and an opposite rear end, and a cavity extending along an axial direction through the body from the front end to the rear end, the shell including a plurality of first key features formed along an interior surface thereof;

an electrically insulating housing insert including a body, the body having a front end and an opposite rear end and a contact-receiving cavity extending along an axial direction through the body from the front end to the rear end, the housing insert disposed within the cavity of the shell, the housing insert including a plurality of second key features formed along an exterior surface of the body; and a wire-terminating electrical contact housed within the contact-receiving cavity of the housing insert, the electrical contact having a mating interface disposed along the front end of the housing insert, wherein a wire terminated by the electrical contact extends through the contact-receiving cavity and out the rear end of the housing insert, wherein the housing insert is insertable into the shell in any one of a plurality of indexing positions based on the plurality of second key features of the housing insert engaging a corresponding subset of the plurality of first key features of the shell, each indexing position of the plurality of indexing positions defining an angular orientation of the housing insert relative to the shell.

2. The electrical connector of claim 1, where the shell further includes a scale formed along the rear end thereof, the scale including a notation corresponding to a position of each first key feature of the plurality of first key features on the interior surface of the shell.

3. The electrical connector of claim 1, wherein the housing insert further includes a shoulder formed along an exterior surface thereof, the electrical connector further comprising a retaining ring seated against the shoulder to secure the housing insert within the shell.

4. The electrical connector of claim 1, wherein the wire-terminating electrical contact is a pin contact including a body seated within the housing insert and a head extending outwardly through the front end, wherein the pin contact is rated to carry a current of 150 A.

5. The electrical connector of claim 1, further comprising a contact-retaining clip encircling the wire-terminating electrical contact and seated within the housing insert.

6. The electrical connector of claim 1, the shell further including a lip formed within the interior surface thereof, and wherein the plurality of first key features are formed on the lip.

7. The electrical connector of claim 6, further comprising a mating seal seated with the cavity of the shell and against the lip, the mating seal facing toward the front end of the shell.

8. The electrical connector of claim 1, wherein the wire-terminating electrical contact is a socket contact including a body seated within the housing insert and a plurality of cantilevered fingers extending outwardly through the front end, wherein the socket contact is rated to carry a current of 150 A.

9. The electrical connector of claim 8, further comprising a napkin ring encircling the plurality of cantilevered fingers, the napkin ring applying a spring force onto the cantilevered fingers.

10. An electrical connector system comprising:

a pin connector including:

a shell including a body, the body having a front end and an opposite rear end, and a cavity extending along an axial direction through the body from the front end to the rear end, the shell including a plurality of first key features formed along an interior surface thereof;

an electrically insulating housing insert including a body, the body having a front end and an opposite rear end and a contact-receiving cavity extending along an axial direction through the body from the front end to the rear end, the housing insert disposed within the cavity of the shell, the housing insert including a plurality of second key features formed along an exterior surface of the body; and a wire-terminating pin contact housed within the contact-receiving cavity of the housing insert, the pin contact having a mating interface disposed along the front end of the housing insert, wherein a wire terminated by the pin contact extends through the contact-receiving cavity and out the rear end of the housing insert, wherein the housing insert is insertable into the shell in any one of a plurality of indexing positions based on the plurality of second key features of the housing insert engaging a corresponding subset of the plurality of first key features of the shell, each indexing position of the plurality of indexing positions defining an angular orientation of the housing insert relative to the shell; and a socket connector including:

a shell including a body, the body having a front end and an opposite rear end, and a cavity extending along an axial direction through the body from the front end to the rear end, the shell including a plurality of first key features formed along an interior surface thereof;

an electrically insulating housing insert including a body, the body having a front end and an opposite rear end and a contact-receiving cavity extending along an axial direction through the body from the front end to the rear end, the housing insert disposed within the cavity of the shell, the housing insert including a plurality of second key features formed along an exterior surface of the body; and a wire-terminating socket contact housed within the contact-receiving cavity of the housing insert, the socket contact having a mating interface disposed along the front end of the housing insert, wherein a wire terminated by the socket contact extends through the contact-receiving cavity and out the rear end of the housing insert, and wherein the housing insert is insertable into the shell in any one of a plurality of indexing positions based on the plurality of second key features of the housing insert engaging a corresponding subset of the plurality of first key features of the shell, each indexing position of the plurality of indexing positions defining an angular orientation of the housing insert relative to the shell, wherein the pin contact extends into and is received between the plurality of cantilevered fingers of the socket contact when the pin connector and the socket connector are in a mated configuration.

11. The electrical connector system of claim 10, wherein one of the pin connector or the socket connector includes a plurality of locking channels formed on the shell, and the other of the pin connector or the socket connector includes a plurality of locking keys formed on the shell, the locking channels and locking keys engaging one another when the pin connector and socket connector are mated to resist independent rotation relative to one another.

12. The electrical connector system of claim 10, wherein for each of the pin connector and the socket connector, the shell further includes a scale formed along the rear end thereof, the scale including a notation corresponding to a position of each first key feature of the plurality of first key features on the interior surface of the shell.

13. The electrical connector system of claim 10, wherein for each of the pin connector and the socket connector, the housing insert further includes a shoulder formed along an exterior surface thereof, the electrical connector system further comprising a retaining ring seated against the shoulder to secure the housing insert within the shell.

14. The electrical connector system of claim 10, wherein the pin contact includes a body seated within the housing insert and a head extending outwardly through the front end, and wherein the pin contact is rated to carry a current of 150 A.

15. The electrical connector system of claim 10, further comprising a first contact-retaining clip encircling the pin contact and seated within the housing insert of the pin connector, and a second contact-retaining clip encircling the socket contact and seated within the housing insert of the socket connector.

16. The electrical connector system of claim 10, wherein for each of the pin connector and the socket connector, each first key feature of the plurality of first key features is disposed at 15 degree intervals within the interior surface of the shell.

17. The electrical connector system of claim 10, wherein for each of the pin connector and the socket connector, the shell further includes a lip formed within the interior surface thereof, and wherein the plurality of first key features are formed on the lip.

18. The electrical connector system of claim 17, further comprising a mating seal seated with the cavity of the shell and against the lip of the pin connector, the mating seal facing toward the front end of the shell.

19. The electrical connector system of claim 10, wherein the socket contact includes a body seated within the housing insert and a plurality of cantilevered fingers extending outwardly through the front end, and wherein the socket contact is rated to carry a current of 150 A.

20. The electrical connector system of claim 19, further comprising a napkin ring encircling the plurality of cantilevered fingers of the socket contact, the napkin ring applying a spring force onto the cantilevered fingers to retain the pin contact in position when the pin connector and socket connector are mated.

* * * * *